United States Patent
Liu et al.

(10) Patent No.: US 10,210,636 B2
(45) Date of Patent: Feb. 19, 2019

(54) AUTOMATIC SNAP FOR DIGITAL SKETCH INKING

(71) Applicant: Autodesk, Inc., San Rafael, CA (US)

(72) Inventors: Ning Liu, Shanghai (CN); Lei Wang, Shanghai (CN)

(73) Assignee: AUTODESK, INC., San Rafael, CA (US)

( * ) Notice: Subject to any disclaimer, the term of this patent is extended or adjusted under 35 U.S.C. 154(b) by 7 days.

(21) Appl. No.: 15/253,540

(22) Filed: Aug. 31, 2016

(65) Prior Publication Data

US 2018/0061093 A1 Mar. 1, 2018

(51) Int. Cl.
*G06T 11/20* (2006.01)
*G06T 5/00* (2006.01)
*G06T 3/00* (2006.01)
*G06T 3/60* (2006.01)

(52) U.S. Cl.
CPC .......... *G06T 11/203* (2013.01); *G06T 3/0081* (2013.01); *G06T 3/606* (2013.01)

(58) Field of Classification Search
CPC ..... G06T 11/203; G06T 5/006; G06F 17/242; G06K 9/52
See application file for complete search history.

(56) References Cited

U.S. PATENT DOCUMENTS

| | | | | |
|---|---|---|---|---|
| 2003/0098862 A1* | 5/2003 | Hunt | ........ | G06T 17/00 345/418 |
| 2007/0165943 A1* | 7/2007 | Guetter | ........ | G06K 9/6212 382/159 |
| 2008/0279478 A1* | 11/2008 | Tsoupko-Sitnikov | ........ | H04N 19/54 382/298 |
| 2013/0231771 A1* | 9/2013 | Zoran | ........ | B44B 3/009 700/182 |
| 2013/0241934 A1* | 9/2013 | Norris | ........ | G06K 9/00416 345/442 |
| 2013/0300190 A1* | 11/2013 | Mao | ........ | G01R 31/3624 307/9.1 |
| 2015/0221070 A1* | 8/2015 | Winnemoeller | ........ | G06T 11/001 382/203 |

OTHER PUBLICATIONS

WikiPedia, Gaussian function, Aug. 16, 2016, p. 4.*
Bergou, M., et al., "Discrete Elastic Rods", ACM Transactions on Graphics (TOG), vol. 27, No. 3, ACM SIGGRAPH, 2008.
Veltkamp, R. C., et al., "Modeling 3D Curves of Minimal Energy", Computer Graphics Forum, vol. 14, No. 3, Blackwell Science Ltd, 1995.

* cited by examiner

*Primary Examiner* — Yi Yang
(74) *Attorney, Agent, or Firm* — Gates & Cooper LLP

(57) ABSTRACT

A method, system, and computer program product provide the ability to ink a drawing. A coarse original sketch is loaded. User input drawing an initial stroke over the coarse original sketch is accepted. A stroke smoothness of the initial stroke is measured. A similarity between the initial stroke and the coarse original sketch is measured to determine a snap affect. The stroke smoothness and the snap affect are combined. The initial stroke is automatically/dynamically, without additional user input, modified based on the combination.

16 Claims, 12 Drawing Sheets

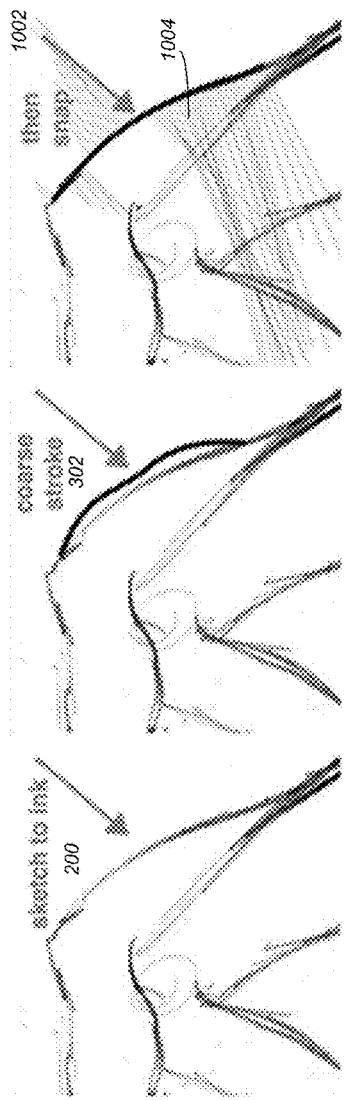
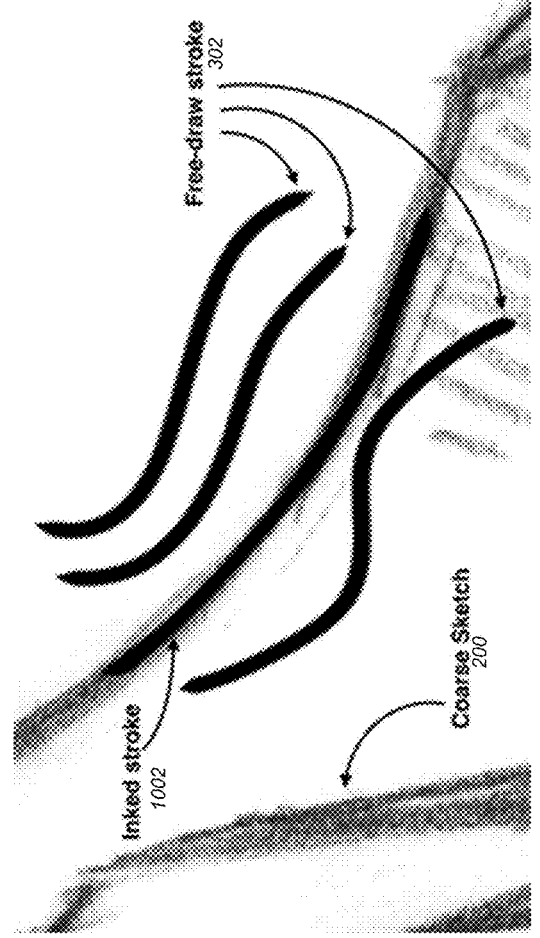

AUTOMATIC SNAP FOR DIGITAL SKETCH INKING

BACKGROUND OF THE INVENTION

1. Field of the Invention

The present invention relates generally to computer drawing applications, and in particular, to a method, apparatus, system, and article of manufacture for creating smooth vector strokes on top of coarse input sketches.

2. Description of the Related Art (Note: This application references a number of different publications as indicated throughout the specification by author names enclosed in brackets, e.g., [LastName]. A list of these different publications ordered according to these reference names can be found below in the section entitled "References." Each of these publications is incorporated by reference herein.)

Digital inking is the manual procedure where a user draws smooth vector strokes on top of a coarse input sketch, producing a much cleaner version ready for subsequent editing such as coloring. As the input sketch (e.g., pencil work) may lack an organizational structure (e.g., may be messy) with multiple strokes stacked together, generating clean and smooth strokes is time consuming and error-prone, especially for non-professional users, leading to both low quality and inefficiency in a whole inked production. To better understand these problems, a description of the prior art inking process may be useful.

Inking is an important step in modern digital art creation (e.g., animation and production). Generally, the artists' drawings are scanned into the computer, and then inked, colored, and composited with different software solutions. For example, an artist may hand sketch an image that has very coarse strokes. Thereafter, a careful inking process is conducted in which clean strokes are overlaid/placed on top of the coarse strokes. However, the quality and efficiency of the inking process is critical for the subsequent operations such as coloring and compositing. Unfortunately, the prior art inking processes are time consuming and often require a unique set of skills/expertise by the artist.

Some prior art software products (e.g., ADOBE ILLUSTRATOR and AUTODESK SKETCHBOOK) may provide tools that attempt to aid a user in the inking process. However, even with the use of such tools, the inking quality remains heavily dependent on the user's experience and skill. Thus, it is difficult for a non-professional user to efficiently ink quality results. In view of the above, what is needed is a digital sketch inking tool that improves efficiency and accuracy.

SUMMARY OF THE INVENTION

Embodiments of the invention provide an inking method that generates high quality inking results efficiently with only limited user interaction. From the user's perspective, this unique behavior can be perceived that starts from a simple inaccurate initial stroke, and automatically/dynamically generates and snaps a high quality stroke to the proper position of the original sketch, thereby making the inking process much more efficient.

BRIEF DESCRIPTION OF THE DRAWINGS

Referring now to the drawings in which like reference numbers represent corresponding parts throughout:

FIGS. 10A-10C illustrate an exemplary user interaction workflow for inking a sketch in accordance with one or more embodiments of the invention;

FIG. 12 demonstrates the snap result in different positions in accordance with one or more embodiments of the invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Unlike prior art methods, embodiments of the invention recognize that original sketch of a user contains enough information to imply where an inked stroke should be positioned. Accordingly, embodiments of the invention leverage such information to provide a better inking result.

In view of the above, embodiments of the invention provide a new automatic snap method for performing the inking. Unlike the simple boundary snap technique used in user interface design, an optimization-based framework enables non-professional users to acquire quality results easily. Moreover, embodiments of the invention may be used in mobile devices where accurate input is difficult to achieve.

Figure 1:
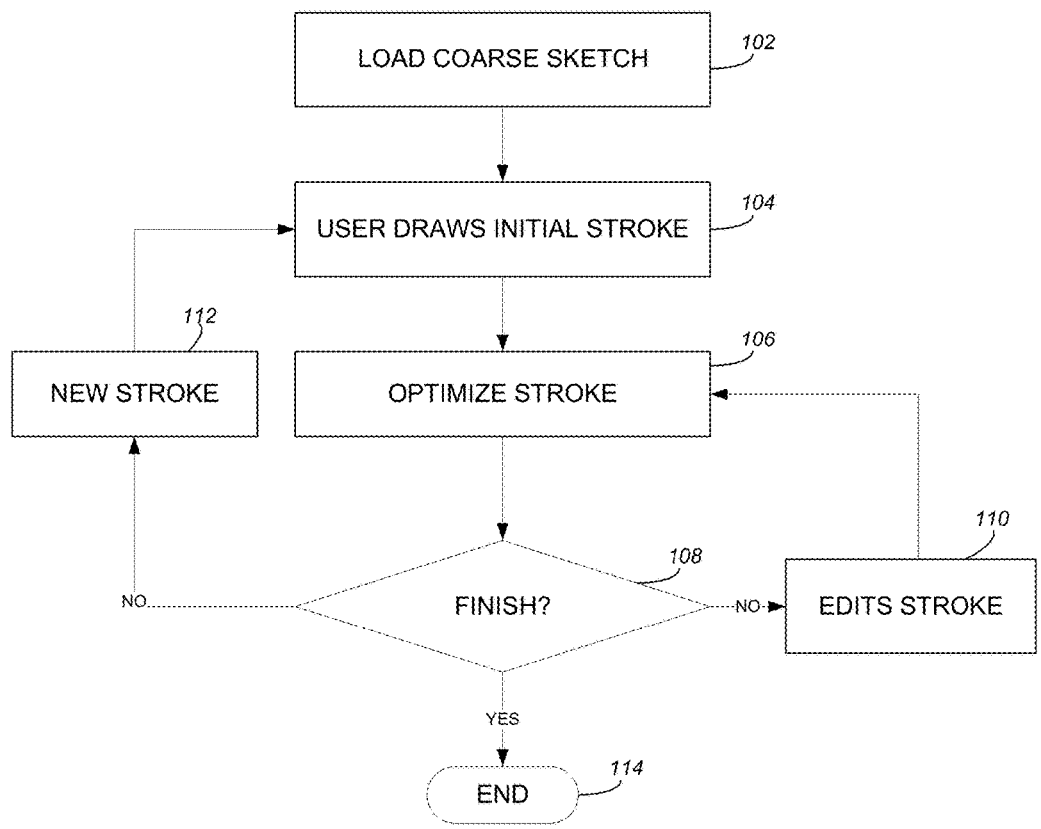
FIG. 1 illustrates the framework of a method used to perform inking in accordance with one or more embodiments of the invention.

FIG. 1 illustrates the framework of a method used to perform inking in accordance with one or more embodiments of the invention.

At step 102, the original sketch is loaded (i.e., scanned and loaded into the application/onto the screen).

After the original sketch is loaded, at step 104, the user is enabled with the ability to ink on top of the sketch. This inking process includes the user drawing an initial stroke that is overlaid (or displayed in an overlaid fashion) on the coarse sketch. Further, such a step may include entering/activating an "inking" mode.

At step 106, the initial stroke is optimized. In this regard, each time the user finishes a stroke (at step 104), the optimization problem is triggered to move the stroke to an optimized new position (i.e., where the stroke in the optimized new position is output/displayed). The optimization and stroke movement is performed automatically and dynamically without additional user input (e.g., as the user is performing the inking, the stroke is smoothed and snapped to the optimized position dynamically). If the user desires further editing of the stroke, a determination is made that the process is not complete at step 108, and the user can further adjust the stroke by editing (e.g., directly dragging the stroke where needed) at step 110. Subsequent to the editing (e.g., after the dragging ends), the optimization process is repeated at step 106. Alternatively, the user can opt to draw a new stroke at step 112 thereby returning the processing to step 104.

Once all strokes, editing, and stroke optimizations are complete, the process ends at step 114.

Figure 2:
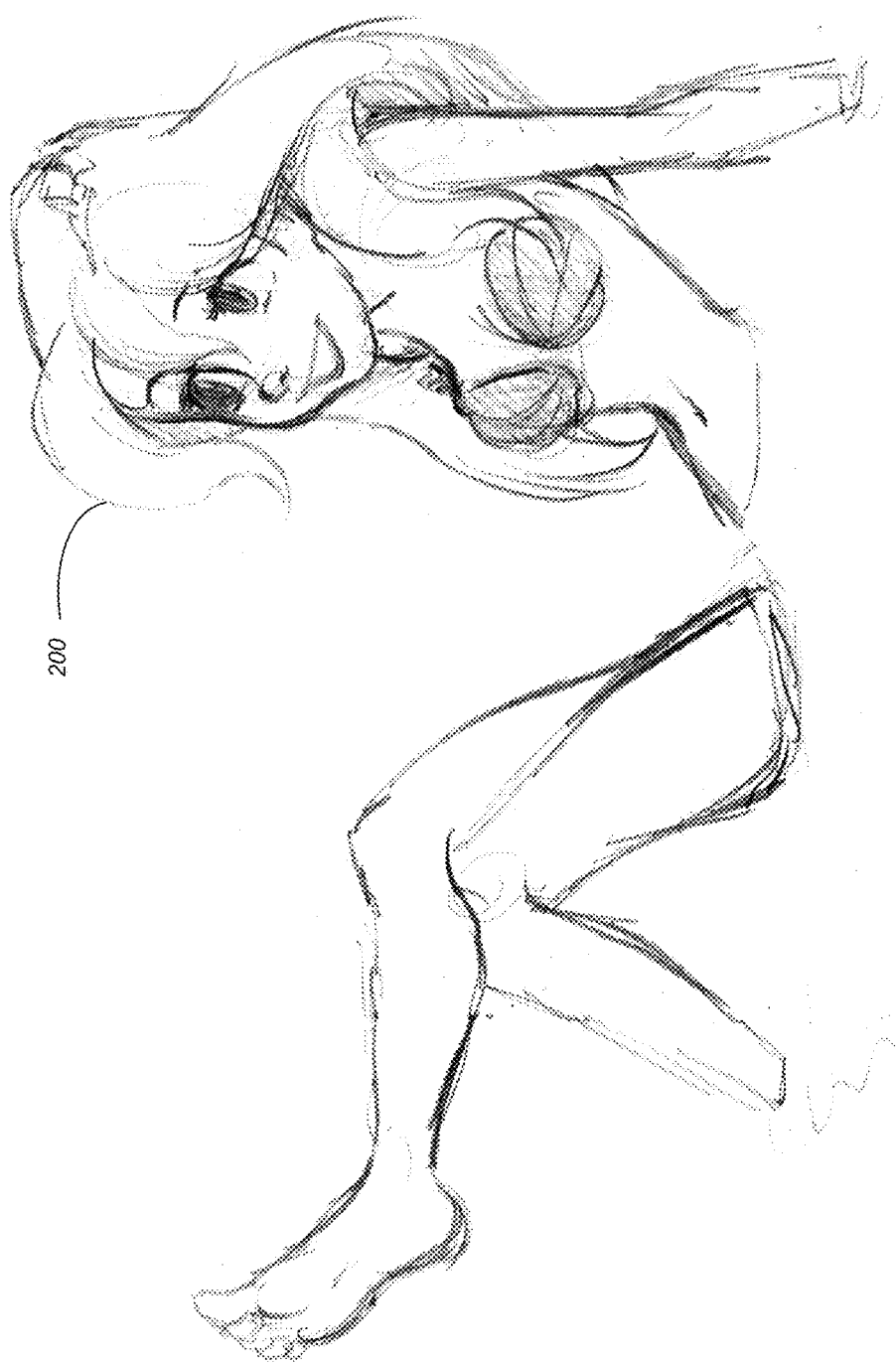
FIG. 2 illustrates an example of an original sketch that a user desires to ink in accordance with one or more embodiments of the invention.

To better understand the invention, some terminology definitions may be useful:

"Original sketch" refers to the input two-dimensional (2D) coarse sketch for inking. The original sketch is often a raster/rasterized image such as a raster scan of a real paper drawing. The original sketch FIG. 2 illustrates an example of an original sketch that a user desires to ink in accordance with one or more embodiments of the invention.

Figure 3:
FIG. 3 illustrates the initial stroke drawn over the original sketch in accordance with one or more embodiments of the invention.

"Initial Stroke" is the stroke drawn by a user over the original sketch (that is to be optimized as described herein). FIG. 3 illustrates the initial stroke 302 drawn over the original sketch 200 in accordance with one or more embodiments of the invention.

Figure 4:
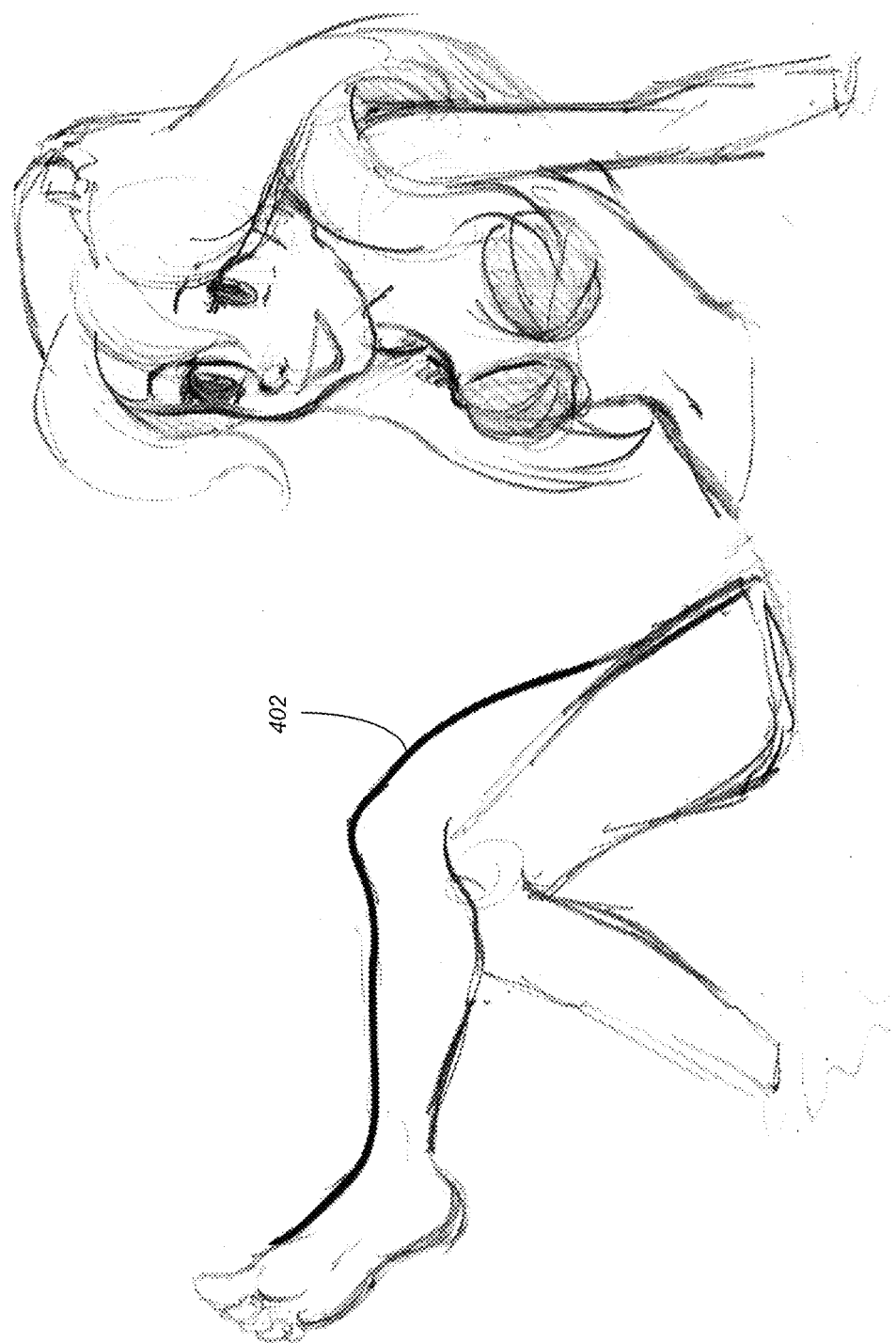
FIG. 4 illustrates the resulting inked stroke generated in accordance with one or more embodiments of the invention.

"Inked stroke" or "Optimized Stroke" is the stroke generated by embodiments of the invention. FIG. 4 illustrates the resulting inked stroke 402 generated in accordance with one or more embodiments of the invention.

"End points" are the discrete points that form a discrete stroke.

Energy Optimization

Once the original sketch 200 is loaded and the initial stroke 302 is drawn, the next step is to optimize the inked stroke 302 (i.e., step 106 of FIG. 1). Embodiments of the invention approach the optimization problem mathematically and formulates the inking process as finding each stroke that minimizes the sum of two discrete energy terms:

Smooth Energy Term—the term that measures the stroke smoothness; and

Snap Energy Term—the term that measures the similarity between the initial stroke 302 and the original sketch 200.

Once the two energy terms are combined together and a boundary condition is properly set, the optimization problem can be solved to generate/acquire the inked stroke 402.

Smooth Energy Term

The computation of the smooth energy is a technique used to obtain a smooth curve by minimizing some suitable energy function, either in modeling [Veltcamp] or physical based simulation [Bergou]. Embodiments of the invention compute each stroke as a smooth discrete curve. Thereafter, a vector stroke (referred to as a turning vector) is computed using the discrete curve's end points as control points.

Figure 5:
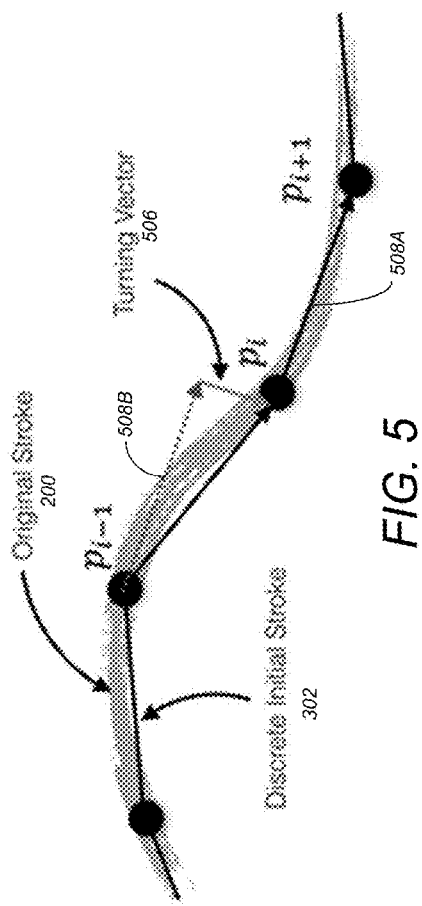
FIG. 5 illustrates a discrete curve and a computed turning vector in accordance with one or more embodiments of the invention.

FIG. 5 illustrates a discrete curve and a computed turning vector in accordance with one or more embodiments of the invention. As illustrated, the original stroke 200 is part of the original sketch obtained/acquired by the user at step 102 of FIG. 1. The user then draws the discrete initial stroke 302. Supposing the initial stroke 302 is constructed by a set of discrete 2D points $p_1, \ldots p_n$, one can model the discrete turning vector 506 $k_i$ as the change of edge vectors at position $p_i$:

$$\kappa_i = (p_i - p_{i-1}) - (p_{i+1} - p_i) = 2p_i - p_{i-1} - p_{i+1}$$

In other words, one translates the vector $\overline{(p_i, p_{i+1})}$ 508A to point $p_{i-1}$ (i.e., 508B) and computes the turning vector 506 to point $p_i$ (i.e., the vector from the end point of the translated vector 508B to point $p_i$).

For continuous curves, in order to guarantee the curve is globally smooth, one can minimize the total changes of the turning vector ε 506:

$$\varepsilon = \int_0^L d\kappa^2 ds$$

Thus for discrete curves, the corresponding formation becomes:

$$E_{smooth} = \Sigma_i (\kappa_{i+1} - \kappa_i)^2$$

The energy term $E_{smooth}$ makes sure the changing of the turning vector 506 is small everywhere on the stroke, leading to global smoothness of the whole stroke.

In other words, each smooth energy term measures a turning vector 506 of a discrete segment (of the discrete initial stroke 302). The points p used to compute the turning vector may be acquired in a variety of different ways including the sampled event points received from the device used to draw the stroke (e.g., the event points acquired from the mouse, stylus, etc.) (e.g., as the mouse/stylus is dragged, the event points are received). The faster the drawing device is moved, the coarser the drawing (i.e., the points are further apart if the mouse is dragged quickly compared to a slow dragging of the mouse). In one or more embodiments, an equalizer function may be applied to the sampling events to normalize the distance between points. Such an equalization process may result in an improvement to the quality of the resulting optimization.

Figure 6:
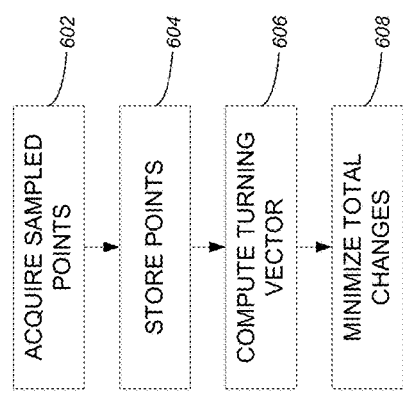
FIG. 6 illustrates an overview of the logical flow for computing the smooth energy term in accordance with one or more embodiments of the invention.

FIG. 6 illustrates an overview of the logical flow for computing the smooth energy term in accordance with one or more embodiments of the invention. At step 602, the sampled points are acquired/received/obtained. At step 604, the acquired points are stored (e.g., as $p_{i-1}$, $p_i$, etc.). At step 606 the turning vector(s) 506 is(are) computed. At step 608, the total changes by the turning vectors 506 are minimized. For a continuous curve, integration may be performed, and for discrete curves, sigma (i.e., the sum of all the turning vectors may be performed).

Snap Energy Term

The snap energy term measures the similarity of the initial stroke and the original sketch/stroke. Suppose there are several strokes stacked together in the original coarse sketch (which is most of the cases), it would be beneficial to generate a stroke that passes through these strokes in a best-fit way.

For an initial stroke, each of the initial strokes' end points should be positioned in an optimized way. Embodiments of the invention optimize the position of each end point by investigating the "drag-force" exposed by neighboring pixels in the original sketch. The "drag-force" represents the error between current positions with the optimized positions. During the optimization, the error decreases along the drag-force's direction, as if the end points are dragged by the drag-force.

As in most cases, positions with high intensity values have multiple user strokes passed through, thus are likely to be passed by the inked stroke, as the fighting result of multiple drag-forces.

To measure the similarity between the initial stroke and the original strokes from the original sketch in a quantitative approach, embodiments of the invention use a local compact region to limit the computation around each discrete point of the stroke. In this way, only neighboring pixels from the original sketch 200 will determine the shape of the optimized stroke.

Figure 7:
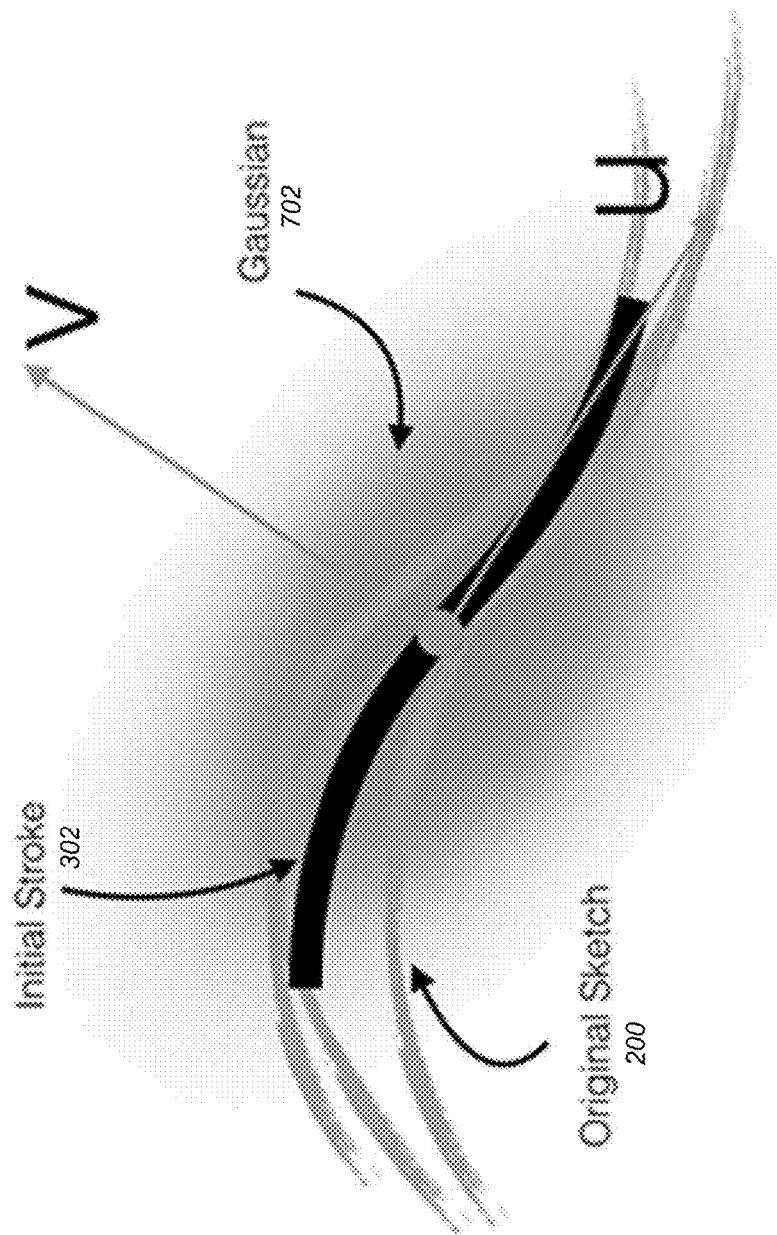
FIG. 7 illustrates a local compact region utilized to compute the similarity between the initial stroke and original sketch/strokes in accordance with one or more embodiments of the invention.

FIG. 7 illustrates a local compact region utilized to compute the similarity between the initial stroke and original sketch/strokes in accordance with one or more embodiments of the invention. As illustrated, the original sketch 200 has many strokes that are close to each other. The user has initiated the inking process and has drawn initial stroke 302. An ellipse defined as a rotated 2D Gaussian 702 defines the local compact region. In particular, the closer one is to the middle of the rotated 2D Gaussian 702, the greater weight that is applied to that point. In other words, a decaying weight function is defined that assigns greater weight towards the middle of the Gaussian 702 and fades along the axes (i.e., less weight is applied as the distance increases along the axes). The following equation defines this distance decaying weight function:

$$w(u, v) = Ae^{-\left[\frac{(u-u_0)^2}{2\sigma_u^2} + \frac{(v-v_0)^2}{2\sigma_v^2}\right]}$$

A is the aptitude of the weight function. (u,v) is the local coordinate at position q=q(x,y) on the initial stroke where the frame axis is aligned with the tangent vector $\vec{u}$ and binormal $\vec{v}$ vector. As the exact tangent and binormal vector is unknown before the inked stroke is computed, the discrete tangent and binormal vector are computed from the initial stroke 302 $p_1^0, \ldots, p_n^0$:

$$\begin{cases} \vec{u_i} = p_{i+1} - p_{i-1} \\ \vec{v_i} = (-\vec{u_i} \cdot y, \vec{u_i} \cdot x) \end{cases}$$

Thereafter, $\vec{u_l}, \vec{v_l}$ is normalized (e.g., into unit vectors). Coordinate (u,v) is easily computed for an arbitrary position q=q(x,y) as:

$$\begin{cases} u = p_i \cdot x + (q - p_i) \cdot \vec{u_i} \\ v = p_i \cdot y + (q - p_i) \cdot \vec{v_i} \end{cases}$$

Figure 8:
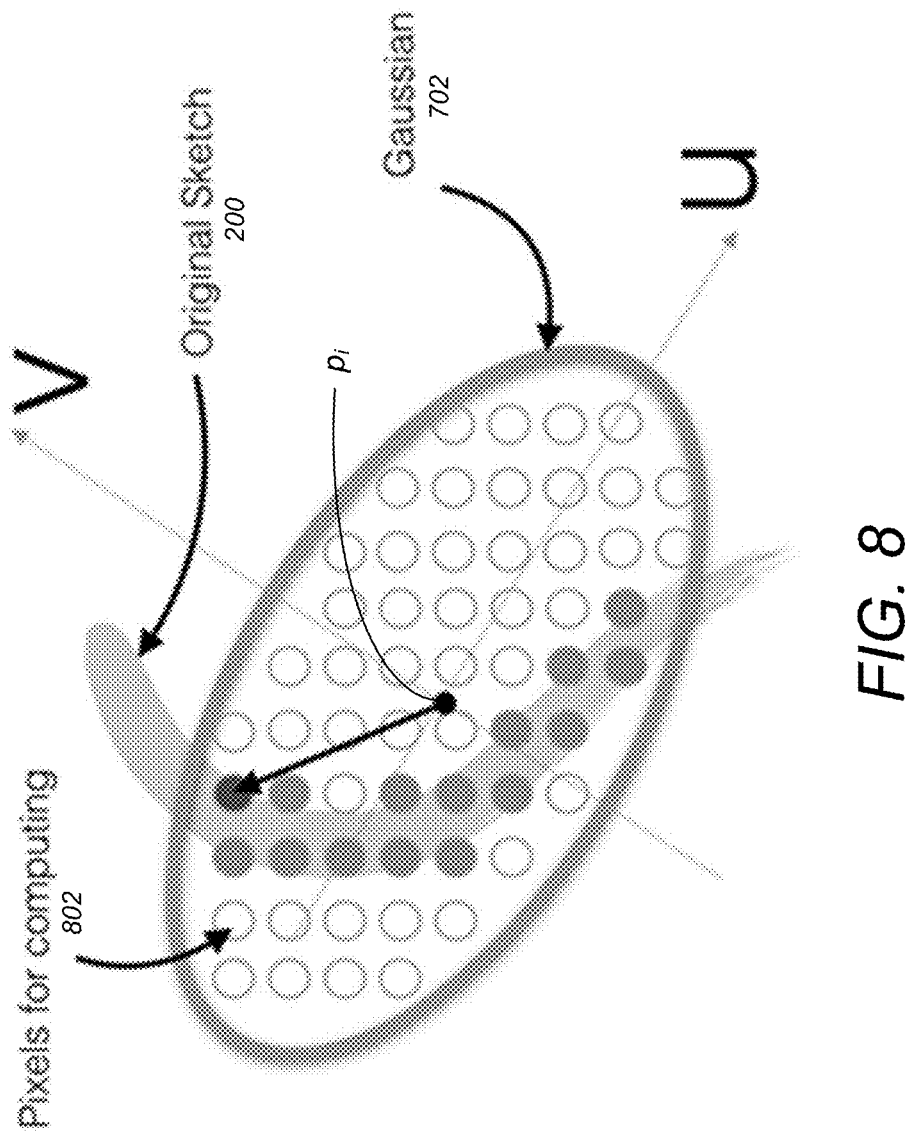
FIG. 8 illustrates the snap calculations and pixels used to compute the weighting applied in the snap energy term in accordance with one or more embodiments of the invention.

$(u_0, v_0)$ is generally (0, 0) in embodiments of the invention $\sigma_u$, $\sigma_v$ control the shape of the Gaussian in tangent and binormal directions respectively, defining how many pixels in the original sketch are going to affect the computation. In this regard, $\sigma_u$, $\sigma_v$ (which may be input by a user if desired) can control the shape of the ellipse (e.g., by increasing/decreasing the major/minor axis of the ellipse) to determine how many pixels will be used in the weighting function. FIG. 8 illustrates the snap calculations and pixels used to compute the weighting applied in the snap energy term in accordance with one or more embodiments of the invention. As illustrated, the ellipse/Guassian 702 defines the range of pixels 802 that are used to analyze the similarity between the original sketch 200 and the initial stroke.

The total "drag force" for end point $p_i$ is $$f_i \Sigma_{q \in N(p_i)} w_q \cdot (255 - I_q) \cdot (q - p_i)^2$$

Here q is the pixel 802 in the compact Gaussian kernel 702 around $p_i$ represented as $N(p_i)$, shown as circles 802. $w_q$ is the weight for end point $p_i$. $I_q$ is intensity of pixel q in the original sketch. In this regard, for a lightly colored original stroke 200, the original stroke 200 may not have as much weight/drag force/affect on the initial stroke 302. However, for heavy/dark original strokes 200, a greater weight will be applied. In this regard, a pixel (short for pixel element) is a small block that represents the amount of gray intensity to be displayed for that particular portion of an image. For most images, pixel intensity values are integers that range from 0 (black) to 255 (white). Accordingly, the intensity of a particular pixel 802 is subtracted from the maximum of 255 and used to determine the drag force. For example, darker images that actually contain the original stroke 200 will have pixel intensity values closer to 0 and hence will have more of an impact on the drag force.

The drag force is computed based on every pixel 200 within the ellipse/Guassian 702 surrounding the sampled point $p_i$. Based on the single end point drag force $f_i$, the total snap energy term for a stroke is:

$$E_{snap} = \Sigma_i f_i = \Sigma_i \Sigma_{q \in N(p_i)} w_q \cdot (255 - I_q) \cdot (q - p_i)^2$$

The snap energy actually reveals how pixels 802 in the original sketch 200 vote for the optimized inked stroke in a way that:

Pixels 802 near the initial stroke 302 have larger impact. This guarantees the final inked result is under user's control.

Pixels 802 with high intensity value have larger impact. This is to cancel the effect of outliers in the original sketch 200.

The snap energy decreases quickly with distance, which helps the energy converge in optimization.

Figure 9:
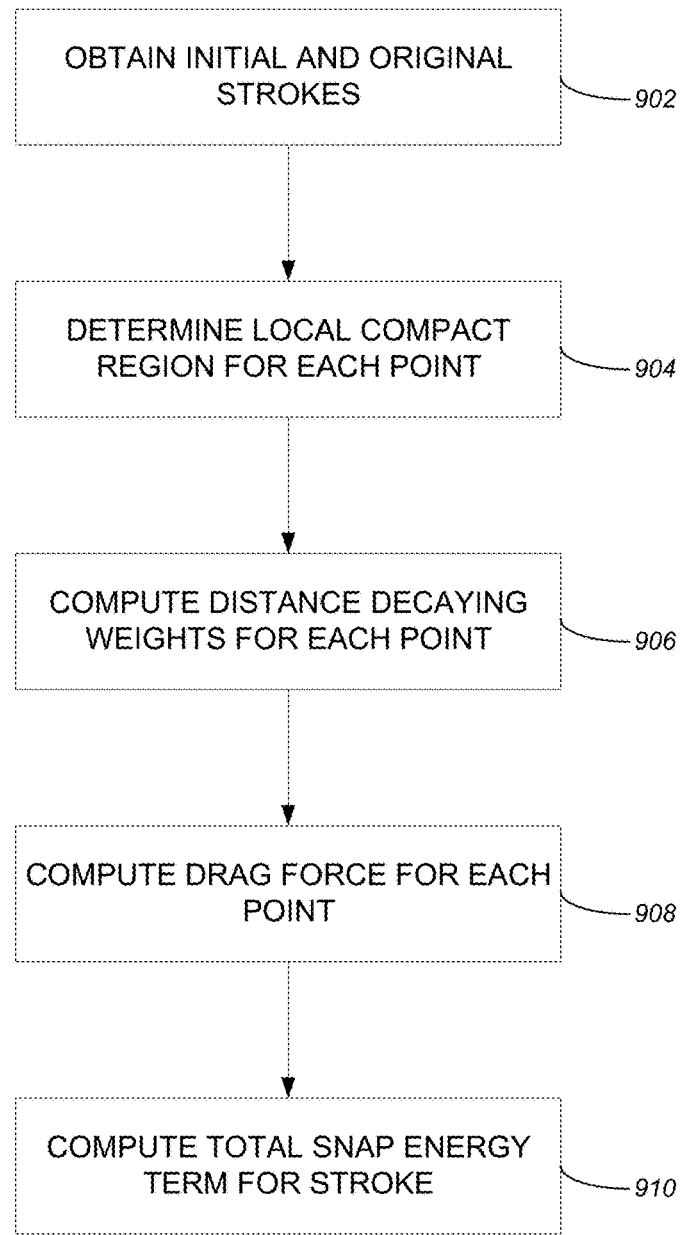
FIG. 9 illustrates the logical flow for computing the snap energy term in accordance with one or more embodiments of the invention.

In summary, FIG. 9 illustrates the logical flow for computing the snap energy term in accordance with one or more embodiments of the invention. At step 902, the initial and original strokes are obtained/input. At step 904, the local compact region for each sampled point in the initial stroke is determined (e.g., an ellipse/Guassian or some other shape as desired). At step 906, the distance decaying weights for each sampled point is determined. At step 908, the total drag force for each point is computed (e.g., based on the distance decaying weights). At step 910, the total snap energy term for the stroke is computed (e.g., based on the drag forces for the points in the stroke).

Solver and Boundary Condition

With the smooth energy term and snap energy term defined, the next step in the process is to minimize the final energy:

$$E = E_{smooth} + \lambda E_{snap}$$

where λ is the parameter to tune the strength of snap effect. Solving the minimization provides the optimized stroke $\{p_1, \ldots, p_n\}$ as $ArgMin_{p_i} E$.

Notice the first term on the right hand side (RHS) only contains second order items of the unknown variables. For the second term on the RHS, instead of using end points $p_1, \ldots, p_n$, the initial stroke end points $p_1^0, \ldots, p_n^0$ are used to compute $w_q$. This approximation guarantees the snap energy only contains second order of unknown variables, empowering the whole problem to be solved with a fast linear solver, by zeroing each of the unknown variables' first order partial derivatives:

$$\frac{\partial E}{\partial p_i} = 0, i = 1 \ldots n$$

One arrives at an n-by-n sparse linear system where n is number of discrete end points for the stroke. The RHS of the system is n-by-2 matrix representing 2D coordinates of the end points. A direct solver or iterative solver can be used to solve the system efficiently to allow an interactive user experience.

Although not required, to achieve a stable result, one or more embodiments may use a Dirichlet boundary condition in two scenarios:

When a user draws the initial stroke, two end points and additional points are set at certain distances as the boundary. This avoids generating an inked stroke that is to distinct from the user's input.

When a user edits the stroke, the moved end points are set as the boundary. This allows the inked stroke to follow the user's editing operation, which may be critical to a good user experience.

Once the inked stroke is computed, the discrete end points can be used as control points for interpolation. Any interpolation scheme can be used to generate a smoother stroke such as cubic splines or Bezier curves. And more features such as pressure data can be integrated easily.

As an alternative to fixed/discrete boundary/end points, embodiments of the invention may allow for the end points to be moved. For example, the end points of an initial sketch may be moved based on a threshold such that if the moved endpoint is within a threshold distance of the original sketch, it may be moved. Similarly, if the point is outside of the threshold distance from the original sketch, it can be inferred that the user intends not to be bound to the original sketch, and as a result, the endpoint is not moved. Such a threshold distance could also be tunable (e.g., by the user).

Exemplary Results

FIGS. 10A-10C illustrate an exemplary user interaction workflow for inking a sketch in accordance with one or more embodiments of the invention. FIG. 10A illustrates a portion of FIG. 2 that displays the original sketch 200. FIG. 10B illustrates a portion of FIG. 3 reflecting the input of the coarse initial stroke 302 (a user can use a mouse or stylus as input to input the initial stroke 302). User interface elements may also be used to allow zoom/pan operations, and to allow the user to perform detailed editing. FIG. 10C illustrates the snapping of the initial stroke 302 to the original stroke 200 to create the optimized stroke 1002. As illustrated, the initial stroke 302 the user draws could be very bumpy, and the optimized stroke 1002 is smoothly fit to the correct position. The stroke's moving direction during the optimization is illustrated as lines 1004. In accordance with embodiments of the invention, even using a low-accuracy device such as mouse, a non-professional user is still able to produce high quality inking strokes efficiently.

Figure 11:
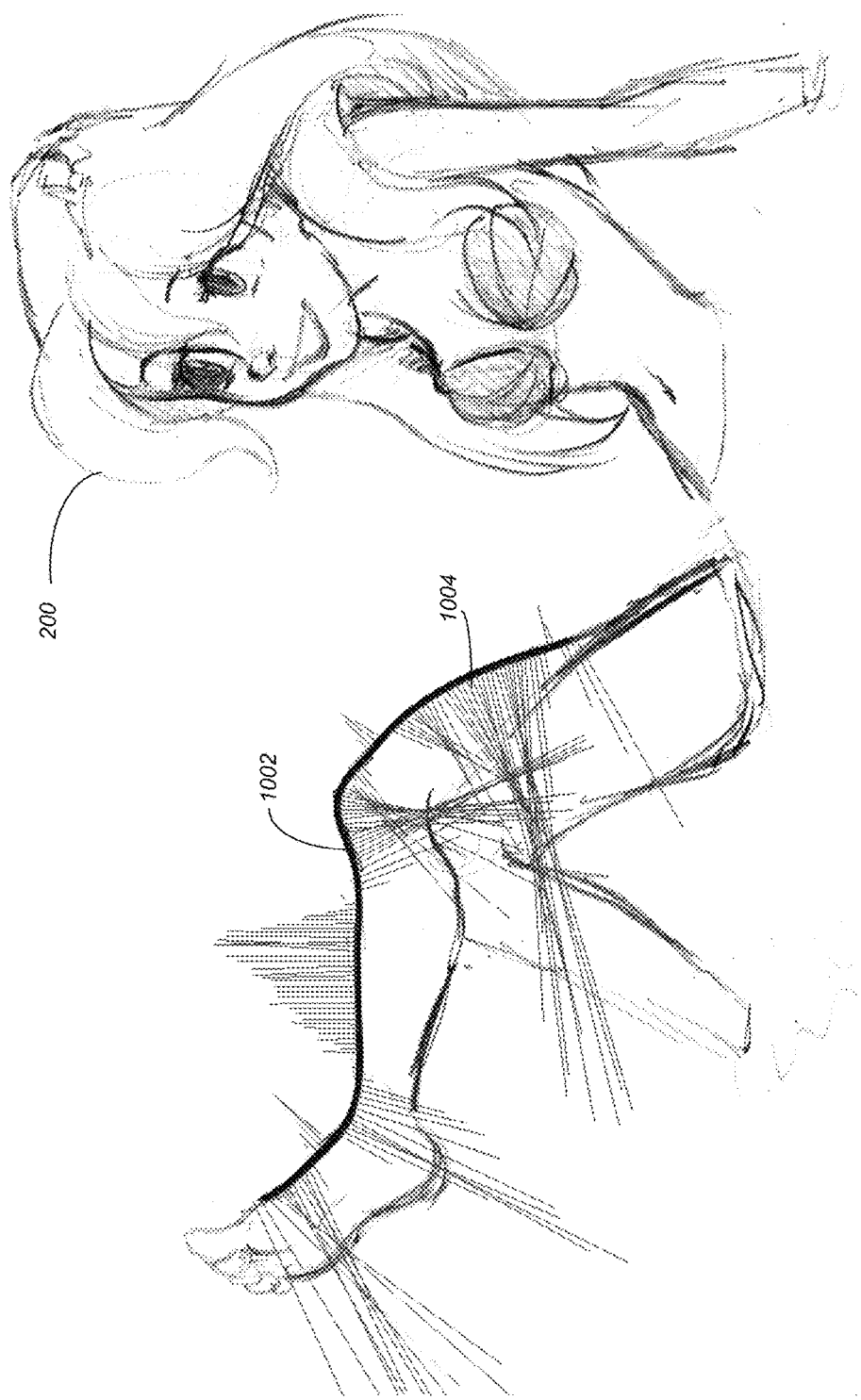
FIG. 11 illustrates a broader view of FIG. 10C indicating the stroke's moving direction during the optimization in accordance with one or more embodiments of the invention.

FIG. 11 illustrates a broader view of FIG. 10C indicating the stroke's moving direction during the optimization in accordance with one or more embodiments of the invention. Each line 2004 is orthogonal to the optimized line 1002 based on the initial stroke. In one or more embodiments, lines 1004 may be displayed to the user. Alternatively, such lines 1004 may be hidden from the user's view (or may optionally be displayed depending on user preferences).

FIG. 12 demonstrates the snap result in different positions in accordance with one or more embodiments of the invention. In this regard, FIG. 12 illustrates three different freedraw initial strokes 302 that are all optimized to the inked stroke 1002. As a compact Gaussian kernel is used for stroke adjustment computing, the automatic snap only takes effect locally. This is important for users because sometimes, user still need to ink freely despite the content of the original sketch. As described above, the user can further tune the snap strength and shape of the Gaussian to enable a more custom specified snap effect. This locality also benefits the performance because only a small fraction of pixels need to be processed.

Further to the above, the inking quality also depends on the quality of the original sketch 200. When inking areas where multiple strokes are stacked together, embodiments of the invention can generate a neutral stroke that tries to pass all the strokes.

Hardware Environment

Figure 13:
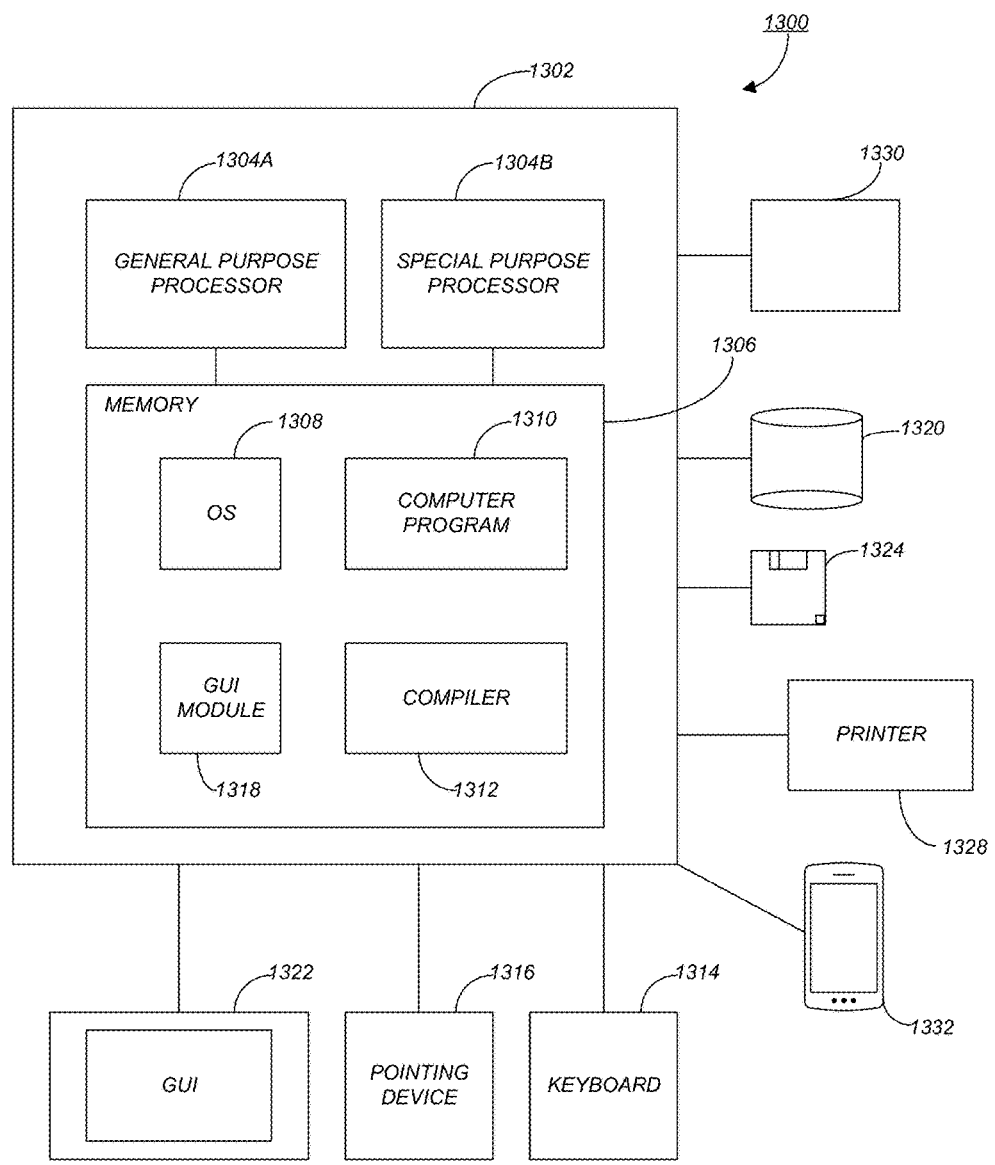
FIG. 13 is an exemplary hardware and software environment used to implement one or more embodiments of the invention.

FIG. 13 is an exemplary hardware and software environment 1300 used to implement one or more embodiments of the invention. The hardware and software environment includes a computer 1302 and may include peripherals. Computer 1302 may be a user/client computer, server computer, or may be a database computer. The computer 1302 comprises a general purpose hardware processor 1304A and/or a special purpose hardware processor 1304B (hereinafter alternatively collectively referred to as processor 1304) and a memory 1306, such as random access memory (RAM). The computer 1302 may be coupled to, and/or integrated with, other devices, including input/output (I/O) devices such as a keyboard 1314, a cursor control device 1316 (e.g., a mouse, a pointing device, pen and tablet, touch screen, multi-touch device, etc.) and a printer 1328. In one or more embodiments, computer 1302 may be coupled to, or may comprise, a portable or media viewing/listening device 1332 (e.g., an MP3 player, IPOD, NOOK, portable digital video player, cellular device, personal digital assistant, etc.). Alternatively, device 1332 may consist of a scanner or other type of image scanning device capable of receiving/inputting raster images scanned from a paper drawing or other means. In yet another embodiment, the computer 1302 may comprise a multi-touch device, mobile phone, gaming system, internet enabled television, television set top box, or other internet enabled device executing on various platforms and operating systems.

In one embodiment, the computer 1302 operates by the general purpose processor 1304A performing instructions defined by the computer program 1310 under control of an operating system 1308. The computer program 1310 and/or the operating system 1308 may be stored in the memory 1306 and may interface with the user and/or other devices to accept input and commands and, based on such input and commands and the instructions defined by the computer program 1310 and operating system 1308, to provide output and results.

Output/results may be presented on the display 1322 or provided to another device for presentation or further processing or action. In one embodiment, the display 1322 comprises a liquid crystal display (LCD) having a plurality of separately addressable liquid crystals. Alternatively, the display 1322 may comprise a light emitting diode (LED) display having clusters of red, green and blue diodes driven together to form full-color pixels. Each liquid crystal or pixel of the display 1322 changes to an opaque or translucent state to form a part of the image on the display in response to the data or information generated by the processor 1304 from the application of the instructions of the computer program 1310 and/or operating system 1308 to the input and commands. The image may be provided through a graphical user interface (GUI) module 1318. Although the GUI module 1318 is depicted as a separate module, the instructions performing the GUI functions can be resident or distributed in the operating system 1308, the computer program 1310, or implemented with special purpose memory and processors.

In one or more embodiments, the display 1322 is integrated with/into the computer 1302 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 1302 according to the computer program 1310 instructions may be implemented in a special purpose processor 1304B. In this embodiment, the some or all of the computer program 1310 instructions may be implemented via firmware instructions stored in a read only memory (ROM), a programmable read only memory (PROM) or flash memory within the special purpose processor 1304B or in memory 1306. The special purpose processor 1304B may also be hardwired through circuit design to perform some or all of the operations to implement the present invention. Further, the special purpose processor 1304B may be a hybrid processor, which includes dedicated circuitry for performing a subset of functions, and other circuits for performing more general functions such as responding to computer program 1310 instructions. In one embodiment, the special purpose processor 1304B is an application specific integrated circuit (ASIC).

The computer 1302 may also implement a compiler 1312 that allows an application or computer program 1310 written in a programming language such as C, C++, Assembly, SQL, PYTHON, PROLOG, MATLAB, RUBY, RAILS, HASKELL, or other language to be translated into processor 1304 readable code. Alternatively, the compiler 1312 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1310 accesses and manipulates data accepted from I/O devices and stored in the memory 1306 of the computer 1302 using the relationships and logic that were generated using the compiler 1312.

The computer 1302 also optionally comprises an external communication device such as a modem, satellite link, Ethernet card, or other device for accepting input from, and providing output to, other computers 1302.

In one embodiment, instructions implementing the operating system 1308, the computer program 1310, and the compiler 1312 are tangibly embodied in a non-transitory computer-readable medium, e.g., data storage device 1320, which could include one or more fixed or removable data storage devices, such as a zip drive, floppy disc drive 1324, hard drive, CD-ROM drive, tape drive, etc. Further, the operating system 1308 and the computer program 1310 are comprised of computer program 1310 instructions which, when accessed, read and executed by the computer 1302, cause the computer 1302 to perform the steps necessary to implement and/or use the present invention or to load the program of instructions into a memory 1306, thus creating a special purpose data structure causing the computer 1302 to operate as a specially programmed computer executing the method steps described herein. Computer program 1310 and/or operating instructions may also be tangibly embodied in memory 1306 and/or data communications devices 1330, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1302.

Figure 14:
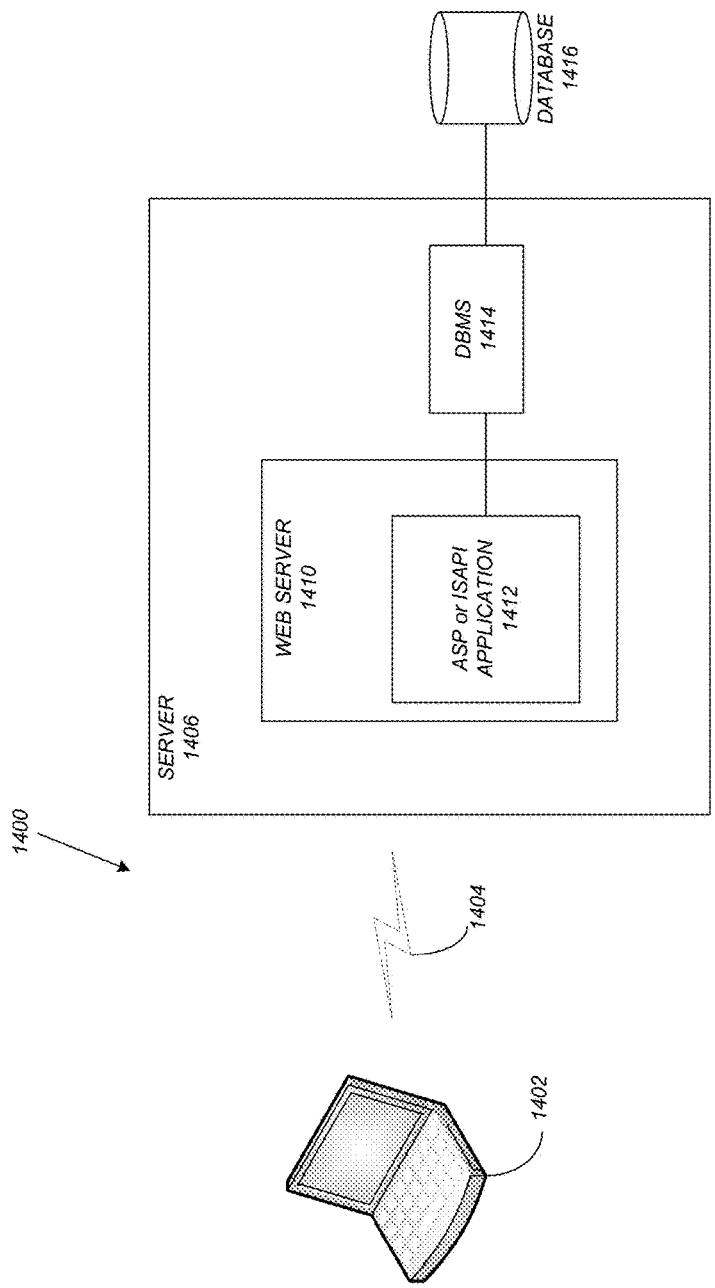
FIG. 14 schematically illustrates a typical distributed/cloud-based computer system in accordance with one or more embodiments of the invention.

FIG. 14 schematically illustrates a typical distributed/cloud-based computer system 1400 using a network 1404 to connect client computers 1402 to server computers 1406. A typical combination of resources may include a network 1404 comprising the Internet, LANs (local area networks), WANs (wide area networks), SNA (systems network architecture) networks, or the like, clients 1402 that are personal computers or workstations (as set forth in FIG. 13), and servers 1406 that are personal computers, workstations, minicomputers, or mainframes (as set forth in FIG. 13). However, it may be noted that different networks such as a cellular network (e.g., GSM [global system for mobile communications] or otherwise), a satellite based network, or any other type of network may be used to connect clients 1402 and servers 1406 in accordance with embodiments of the invention.

A network 1404 such as the Internet connects clients 1402 to server computers 1406. Network 1404 may utilize ethernet, coaxial cable, wireless communications, radio frequency (RF), etc. to connect and provide the communication between clients 1402 and servers 1406. Further, in a cloud-based computing system, resources (e.g., storage, processors, applications, memory, infrastructure, etc.) in clients 1402 and server computers 1406 may be shared by clients 1402, server computers 1406, and users across one or more networks. Resources may be shared by multiple users and can be dynamically reallocated per demand. In this regard, cloud computing may be referred to as a model for enabling access to a shared pool of configurable computing resources.

Clients 1402 may execute a client application or web browser and communicate with server computers 1406 executing web servers 1410. Such a web browser is typically a program such as MICROSOFT INTERNET EXPLORER, MOZILLA FIREFOX, OPERA, APPLE SAFARI, GOOGLE CHROME, etc. Further, the software executing on clients 1402 may be downloaded from server computer 1406 to client computers 1402 and installed as a plug-in or ACTIVEX control of a web browser. Accordingly, clients 1402 may utilize ACTIVEX components/component object model (COM) or distributed COM (DCOM) components to provide a user interface on a display of client 1402. The web server 1410 is typically a program such as MICROSOFT'S INTERNET INFORMATION SERVER.

Web server 1410 may host an Active Server Page (ASP) or Internet Server Application Programming Interface (ISAPI) application 1412, which may be executing scripts. The scripts invoke objects that execute business logic (referred to as business objects). The business objects then manipulate data in database 1416 through a database management system (DBMS) 1414. Alternatively, database 1416 may be part of, or connected directly to, client 1402 instead of communicating/obtaining the information from database 1416 across network 1404. When a developer encapsulates the business functionality into objects, the system may be referred to as a component object model (COM) system. Accordingly, the scripts executing on web server 1410 (and/or application 1412) invoke COM objects that implement the business logic. Further, server 1406 may utilize MICROSOFT'S TRANSACTION SERVER (MTS) to access required data stored in database 1416 via an interface such as ADO (Active Data Objects), OLE DB (Object Linking and Embedding DataBase), or ODBC (Open DataBase Connectivity).

Generally, these components 1400-1416 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1402 and 1406 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1402 and 1406.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide the ability to enable automatic snap for inking a digital sketch. Compared to traditional manual inking, that is a time-consuming error-prone process, embodiments of the invention help generating strokes that satisfy two important features: smoothness and conformity to input sketch content. In addition, the system and method described herein is very fast and allows interactive feedback. Accordingly, the inking process is greatly improved in both quality and efficiency.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

The following references are incorporated by reference herein:
[Veltkamp] Veltkamp, Remco C., and Wieger Wesselink. "Modeling 3D curves of minimal energy." *Computer Graphics Forum*. Vol. 14. No. 3. Blackwell Science Ltd, 1995; and
[Bergou] Bergou, Miklos, et al. "Discrete elastic rods." *ACM Transactions on Graphics (TOG)*. Vol. 27. No. 3. ACM, 2008.

What is claimed is:

1. A computer-implemented method for inking a drawing comprising:
   (a) loading, into a computer, a coarse original sketch;
   (b) accepting, into the computer, user input drawing an initial stroke over the coarse original sketch;
   (c) measuring, in the computer, a stroke smoothness of the initial stroke;
   (d) measuring, in the computer, a similarity between the initial stroke and the coarse original sketch to determine a snap effect, wherein the measuring the similarity comprises:
      (1) acquiring sampled points in the initial stroke;
      (2) determining a local compact region of the coarse original sketch for each of the sampled points;
      (3) computing distance decaying weights for each of the sampled points based on the local compact region;
      (4) computing a drag force for each of the sampled points based on the distance decaying weights; and
      (5) computing a total snap energy term that determines how pixels in the coarse original sketch affect the initial stroke, wherein:
      the total snap energy term ($E_{snap}$) comprises:

$$E_{snap} = \Sigma_i f_i = \Sigma_i \Sigma_{q \in N(p_i)} w_q \cdot (255 - I_q) \cdot (q - p_i)^2;$$

wherein q is a pixel in the local compact region around sampled point $p_i$ represented as $N(p_i)$, $w_q$ is the distance decaying weight for sampled point $p_i$, $I_q$ is an intensity of pixel q in the coarse original sketch, and $f_i$ represents the drag force;
   (e) combining, in the computer, the stroke smoothness and the snap effect; and
   (f) automatically, without additional user input, modifying and displaying, via the computer, the initial stroke based on the combining.

2. The computer-implemented method of claim 1, wherein the loading comprises:
   scanning a paper drawing to generate a raster image in the computer.

3. The computer-implemented method of claim 1, wherein the measuring the stroke smoothness comprises:
   acquiring sampled points in the initial stroke;
   storing the sampled points;
   computing one or more turning vectors for the sampled points;

computing a smooth energy term that minimizes total changes of the turning vectors.

4. The computer-implemented method of claim 3, wherein:
the sampled points comprise $p_1, \ldots p_n$;
the turning vector comprises a change of edge vectors at position $p_i$:

$$\kappa_i = (p_i - p_{i-1}) - (p_{i+1} - p_i) = 2p_i - p_{i-1} - p_{i+1}; \text{ and}$$

the smooth energy term comprises:

$$E_{smooth} = \Sigma_i (\kappa_{i+1} - \kappa_i)^2.$$

5. The computer-implemented method of claim 1, wherein:
the local compact region comprises a rotated two dimensional (2D) Gaussian.

6. The computer-implemented method of claim 1, wherein:
the distance decaying weights are computed based on:

$$w(u, v) = A e^{-\left[\frac{(u-u_0)^2}{2\sigma_u^2} + \frac{(v-v_0)^2}{2\sigma_v^2}\right]}$$

wherein A is an aptitude, (u,v) is a local coordinate at position $q=q(x,y)$ on the initial stroke where a frame axis is aligned with a tangent vector $\vec{u}$ and binormal $\vec{v}$ vector, $\sigma_u$, $\sigma_v$ control a shape of the local compact region in tangent and binormal directions respectively.

7. The computer-implemented method of claim 1, wherein:
the drag force for each sampled point $p_i$ is computed by:

$$f_i \Sigma_{q \in N(p_i)} w_q \cdot (255 - I_q) \cdot (q - p_i)^2$$

wherein q is a pixel in the local compact region around $p_i$ represented as $N(p_i)$, $w_q$ is the distance decaying weight for sampled point $p_i$, and $I_q$ is an intensity of pixel q in the coarse original sketch.

8. The computer-implemented method of claim 1, wherein the combining computes a final Energy (E):

$$E = E_{smooth} + \lambda E_{snap}$$

wherein $E_{smooth}$ is the stroke smoothness, and A is a parameter to tune a strength of the snap effect ($E_{snap}$);
the final energy is solved using a linear solver, by zeroing each unknown variables' first order partial derivatives:

$$\frac{\partial E}{\partial p_i} = 0, i = 1 \ldots n.$$

9. A system for inking a drawing in a computer system comprising:
(a) a computer having a memory;
(b) an application executing on the computer, wherein the application:
(1) loads a coarse original sketch;
(2) accepts user input drawing an initial stroke over the coarse original sketch;
(3) measures a stroke smoothness of the initial stroke;
(4) measures a similarity between the initial stroke and the coarse original sketch to determine a snap effect, wherein the measuring the similarity comprises:
(i) acquiring sampled points in the initial stroke;
(ii) determining a local compact region of the coarse original sketch for each of the sampled points;
(iii) computing distance decaying weights for each of the sampled points based on the local compact region;
(iv) computing a drag force for each of the sampled points based on the distance decaying weights; and
(v) computing a total snap energy term that determines how pixels in the coarse original sketch affect the initial stroke, wherein:
the total snap energy term ($E_{snap}$) comprises:

$$E_{snap} = \Sigma_i f_i = \Sigma_i \Sigma_{q \in N(p_i)} w_q \cdot (255 - I_q) \cdot (q - p_i)^2;$$

wherein q is a pixel in the local compact region around sampled point $p_i$ represented as $N(p_i)$, $w_q$ is the distance decaying weight for sampled point $p_i$, $I_q$ is an intensity of pixel q in the coarse original sketch, and $f_i$ represents the drag force;
(5) combines the stroke smoothness and the snap affect; and
(6) automatically, without additional user input, modifies and displays the initial stroke based on the combining.

10. The system of claim 9, wherein the application loads the coarse original sketch by:
scanning a paper drawing to generate a raster image in a computer.

11. The system of claim 9, wherein the applications measures the stroke smoothness by:
acquiring sampled points in the initial stroke;
storing the sampled points;
computing one or more turning vectors for the sampled points;
computing a smooth energy term that minimizes total changes of the turning vectors.

12. The system of claim 11, wherein:
the sampled points comprise $p_1, \ldots p_n$;
the turning vector comprises a change of edge vectors at position $p_i$:

$$\kappa_i = (p_i - p_{i-1}) - (p_{i+1} - p_i) = 2p_i - p_{i-1} - p_{i+1}; \text{ and}$$

the smooth energy term comprises:

$$E_{smooth} = \Sigma_i (\kappa_{i+1} - \kappa_i)^2.$$

13. The system of claim 9, wherein:
the local compact region comprises a rotated two dimensional (2D) Gaussian.

14. The system of claim 9, wherein:
the distance decaying weights are computed based on:

$$w(u, v) = A e^{-\left[\frac{(u-u_0)^2}{2\sigma_u^2} + \frac{(v-v_0)^2}{2\sigma_v^2}\right]}$$

wherein A is an aptitude, (u,v) is a local coordinate at position $q=q(x,y)$ on the initial stroke where a frame axis is aligned with a tangent vector $\vec{u}$ and binormal $\vec{v}$ vector, $\sigma_u$, $\sigma_v$ control a shape of the local compact region in tangent and binormal directions respectively.

15. The system of claim 9, wherein:
the drag force for each sampled point $p_i$ is computed by:

$$f_i = \Sigma_{q \in N(p_i)} w_q \cdot (255 - I_q) \cdot (q - p_i)^2$$

wherein q is a pixel in the local compact region around $p_i$ represented as $N(p_i)$, $w_q$ is the distance decaying weight for sampled point $p_i$, and $I_q$ is an intensity of pixel q in the coarse original sketch.

16. The system of claim 9, wherein the application combines by computing a final Energy (E):

$$E=E_{smooth}+\lambda E_{snap}$$

wherein $E_{smooth}$ is the stroke smoothness, and is a parameter to tune a strength of the snap effect ($E_{snap}$);

the final energy is solved using a linear solver, by zeroing each unknown variables' first order partial derivatives:

$$\frac{\partial E}{\partial p_i}=0, i=1 \ldots n.$$

* * * * *